United States Patent [19]

Ekleberry

[11] Patent Number: 5,533,844
[45] Date of Patent: Jul. 9, 1996

[54] TRAVELLING PLATEN WITH EXTENDED AXIS

[76] Inventor: Donald A. Ekleberry, 24018 S. Center Rd., Frankfort, Ill. 60423

[21] Appl. No.: 339,562

[22] Filed: Nov. 15, 1994

[51] Int. Cl.$^6$ .................... B23C 9/00; B25H 1/00
[52] U.S. Cl. .................... 409/159; 108/20; 108/143; 144/287; 144/1.1; 144/286.5; 414/676; 414/750
[58] Field of Search .............. 108/20, 102, 143; 198/594, 812; 144/286 R, 286 A, 287, 1 R, 1 A; 409/145, 159, 163; 414/676, 749, 750; 29/33 P

[56] References Cited

U.S. PATENT DOCUMENTS

| | | | |
|---|---|---|---|
| 3,155,383 | 11/1964 | Whitmore | 108/43 |
| 3,340,820 | 9/1967 | Poisson . | |
| 3,572,680 | 3/1971 | Neff | 108/43 X |
| 3,732,992 | 5/1973 | Busam . | |
| 3,776,074 | 12/1973 | Pearl et al. . | |
| 4,080,009 | 3/1978 | Marathe et al. | 108/43 |
| 4,113,223 | 9/1978 | Kakizaki | 108/43 |
| 4,239,445 | 12/1980 | Ozawa . | |
| 4,259,907 | 4/1981 | Schuck . | |
| 4,538,950 | 4/1985 | Shiomi et al. . | |
| 4,566,837 | 1/1986 | Shiomi et al. . | |
| 4,597,709 | 7/1986 | Yonezawa . | |
| 4,718,810 | 1/1988 | Hoehn et al. . | |
| 4,746,005 | 5/1988 | Bihary et al. . | |
| 4,746,258 | 5/1988 | Loomer et al. . | |
| 4,747,329 | 5/1988 | Lukens, Jr. . | |
| 4,781,285 | 11/1988 | Schlatter et al. | 414/750 |
| 4,793,262 | 12/1988 | Horn . | |
| 4,799,582 | 1/1989 | Itoh . | |
| 5,329,825 | 7/1994 | Askins | 108/20 |
| 5,341,751 | 8/1994 | Cuneo et al. | 108/143 |
| 5,357,819 | 10/1994 | Takei | 108/20 |
| 5,468,101 | 11/1995 | Shods | 108/43 |
| 5,470,196 | 11/1995 | Pame | 414/750 |

FOREIGN PATENT DOCUMENTS

| | | | |
|---|---|---|---|
| 0024032 | 1/1990 | Japan | 108/143 |
| 0024033 | 1/1990 | Japan | 108/143 |
| 1538795 | 1/1979 | United Kingdom | 108/143 |

*Primary Examiner*—W. Donald Bray
*Attorney, Agent, or Firm*—Donald R. Fraser

[57] ABSTRACT

An attachment for a work supporting table of a-metal working machine is provided which will effectively substantially enable the supporting surface to be increased to enable an existing machine to handle large work pieces.

8 Claims, 2 Drawing Sheets

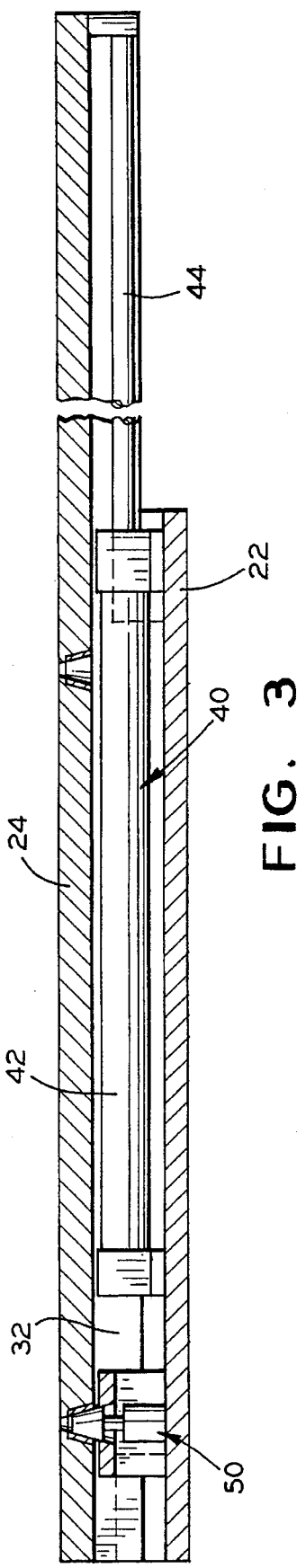
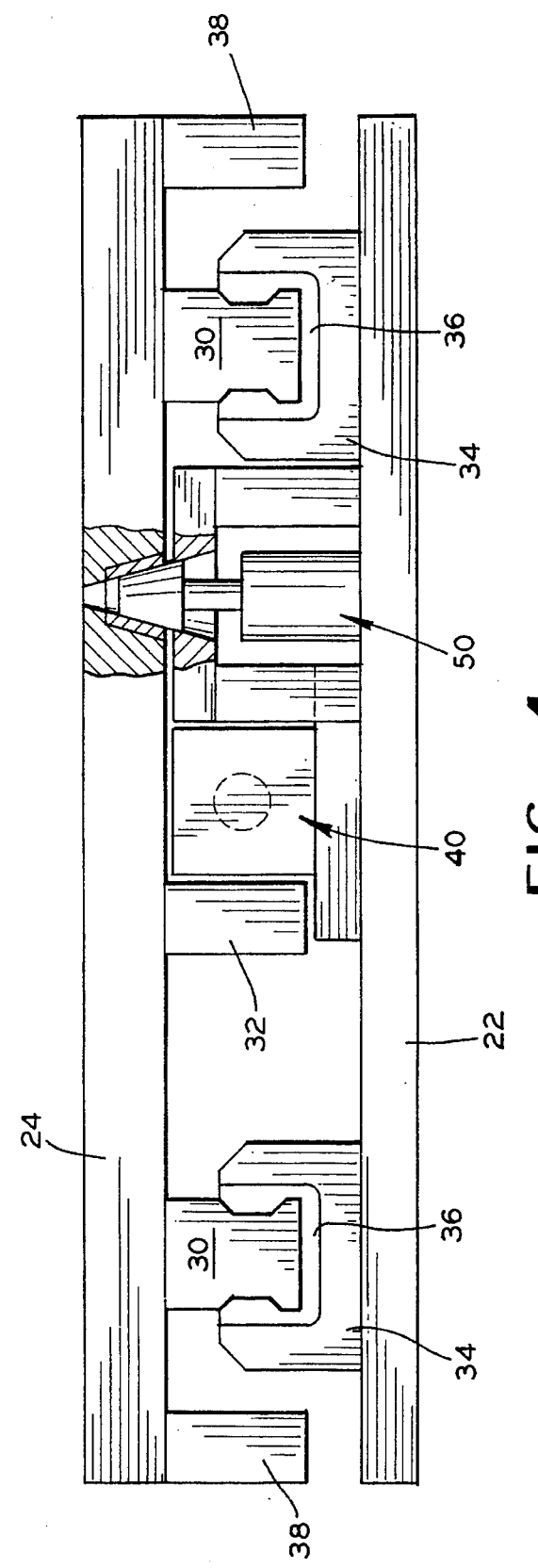
FIG. 3
FIG. 4

TRAVELLING PLATEN WITH EXTENDED AXIS

BACKGROUND OF THE INVENTION

The invention relates generally to the field of metal working machine tools such as milling machines, for example, having a limited size movable work supporting base. More particularly, the invention is concerned with a work supporting base which is readily capable of expansion along the x-axis.

As is often the case, a machinery company is requested to bid on a job for a customer or potential customer wherein the part to be machined is of a length which exceeds the capacity of the machining company's equipment. And further, the profit on the proposed job is insufficient to justify the purchase of new machinery equipment with a work supporting capacity to satisfy the proposed job.

Under these circumstances, the machinery company must choose between a new machine which would accommodate most of the work the machinery company does, or buying a bigger, more expensive machine which would be able to handle the support of work of a considerable range.

Most ideally it would be economically advantageous if the company had another option available. That option would include the purchase of an attachment for its existing machine tools which would increase the size, particularly along the x-axis of the work support without materially decreasing the z-axis clearance.

SUMMARY OF THE INVENTION

It is an object of the present invention to produce an attachment for the work support of existing machine tools wherein the supporting surface particularly along the x-axis may be increased substantially.

Another object of the invention is to produce an attachment for the work support of machine tools wherein the supporting surface along the x-axis may be increased without materially decreasing the z-axis clearance between the supporting surface and the cutting or shaping tool.

Another object of the invention is to produce an attachment for the supporting surface of a machine tool which may be readily attached thereto without the requirement of special skills or tools.

Still another object of the invention is to produce a work support platen attachment for a machine tool the length of which may be readily adjusted along the x-axis.

Another object of the invention is to produce a work supporting attachment for a machine tool which is adjustable as to length and is provided with inherent means for protecting the supporting bearing from metal filings, coolant fluids, or other external contaminant.

BRIEF DESCRIPTION OF THE DRAWINGS

The above as well as other objects and advantages of the invention will become readily manifest to one skilled in the art from reading the following detailed description of the preferred embodiment of the invention when considered in the light of the attached drawings, in which:

FIG. 3 is a sectional view taken along line 3—3 of FIG. 2;

FIG. 4 is a sectional view taken along line 4—4 of FIG. 2.

DESCRIPTION OF THE PREFERRED EMBODIMENTS

Figure 1:
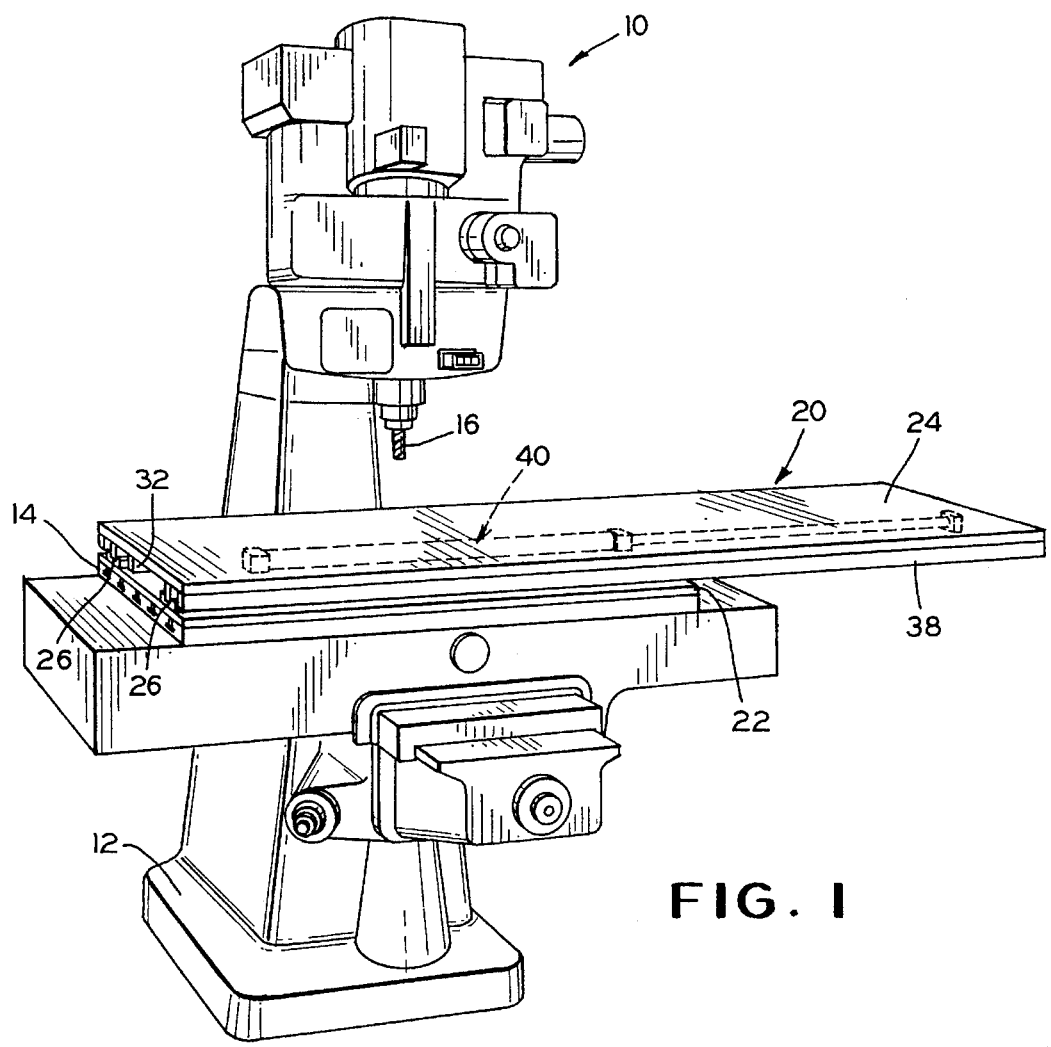
FIG. 1 is a perspective view of a machine tool equipped with a work supporting attachment incorporating the features of the invention.
Figure 2:
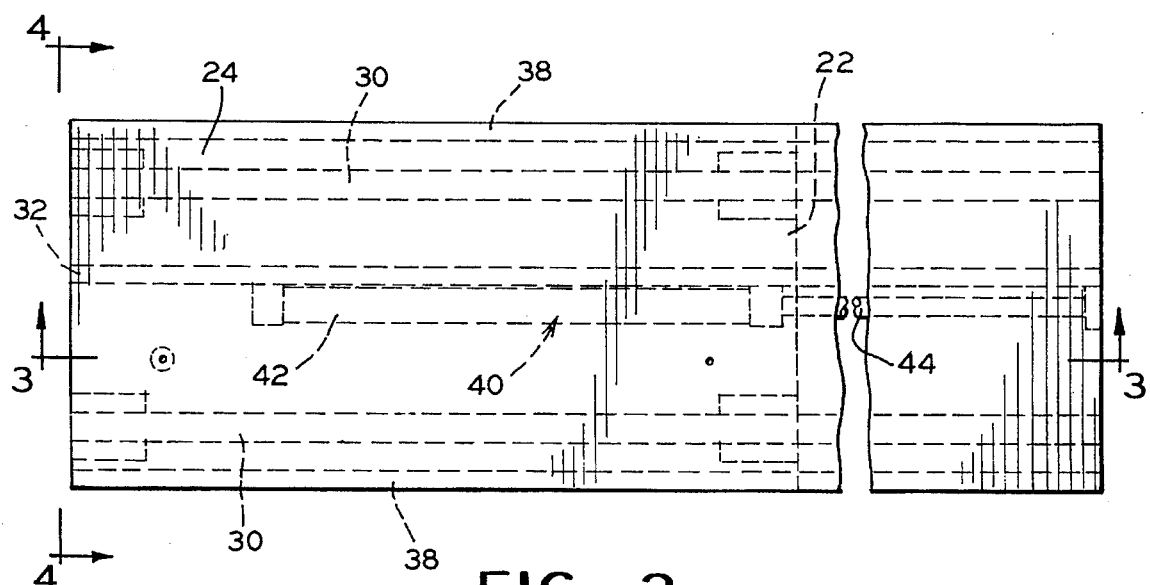
FIG. 2 is a top plane view of the work supporting attachment illustrated in FIG. 1.

Referring to the drawings, and, particularly FIG. 1, there is generally illustrated a machine tool, and more specifically, a metal working mill 10 having machine base 12, a movable work support base 14, and a vertically movable cutting or shaping tool 16.

In order to increase the length of the work support surface over that of the work supporting base 14, an attachment in the form of an extensible platen 20 is secured to the base 14 in any known manner.

The extensible platen 20 includes a lower base plate 22, and an upper tooling plate 24 of greater length along the x-axis. Throughout the description, the use of the term x-axis means the axis which is parallel to the longitudinal axis of the plates 22 and 24, for example; y-axis is the axis perpendicular to the x-axis and lying in a horizontal plane; and z-axis is the axis perpendicular to the x and y axes lying in a vertical plane.

Since the upper tooling plate 24 may be formed of aluminum tooling plate, it may be desirable to provide supplemental stiffening means. To this end, there is provided at least two longitudinally extending stiffeners 32.

The upper tooling plate 24 is slidingly separated from the lower base plate 22 by precision linear bearing means. The bearing means include spaced apart rails 30 which depend in parallel spaced relation from the undersurface of the upper tooling plate 24 and are received to slide reciprocatively within supporting bearing blocks 34 having integral bearing material inserts 36. It will be noted, particularly from an examination of FIG. 4, that the bearing blocks 34 are secured to the upper surface of the lower base plate 22.

Depending from opposite lateral edges of the upper tooling plate 24 are side walls 38. The side walls 38 provide a means shielding and protecting the precision linear bearing means from metal filings and chips, coolant fluids, and other contaminants which could adversely affect the functioning of the bearing means.

In addition to the stiffening of the upper tooling plate 24 by the stiffener 32, the rails 30 and the side walls 38 cooperatively function to provide additional stiffening.

A pressure fluid actuated motor 40 is suitably coupled between the lower base plate 22 and the upper tooling plate 24 to suitably effect relative movement and consequent adjustment therebetween. The motor 40 includes a cylinder 42 having one end secured to the lower base plate 22, a piston (not shown) for reciprocatory movement within the cylinder 42 and an associated piston driven rod 44, the distal end of which is suitably coupled to the upper tooling plate 24. Upon the introduction of pressure fluid into the cylinder 42 through conduit means not shown, the internal piston is caused to be moved and likewise, the associated piston rod 44. Movement of the piston rod 44 causes simultaneous movement of the upper tooling plate 24 to the position illustrated in the drawings. It will be understood that through suitable conventional hydraulic coupling means, for example, pressure fluid can be introduced into the cylinder 42 to cause the opposite movement of the piston and associated piston rod 44 effecting corresponding movement to the upper tooling plate 24 relative to the lower base plate 22.

Further, it will be understood that due to the arrangement of parts, thus far described and illustrated in the drawings, the upper tooling plate 24 can be readily manipulated manually to effect the desired adjustment. Also, through the utilization of the pressure fluid operated motor 40, the position of the plate 24 in respect of the base plate 22 can be effected semi-automatically or fully automatically. Such latter operation being dependant upon the manner or fashion in which the motor 40 is energized. While mention has been made of the use of a pressure fluid actuated motor 40, either pneumatic or hydraulic, an electrically actuated servo (ball screw) drive may likewise be satisfactorily employed.

Once the desired relative positioning of the upper and lower plates 24 and 22, respectively, is achieved, the utilization of tapered pin-lock assemblies 50 may be advantageously employed. The pin-lock assemblies 50 may be tapered or straight and are utilized to assume complete accuracy regardless of the position of the upper tooling plate 24 during any machining operation. Typically the pin-lock assemblies 50 include a precision hardened pin and an associated guide bushing. The assemblies are also vented to prevent pressure build-up or vacuum lock. Also, it will be appreciated that the pin-lock assemblies 50 may be pneumatically or hydraulically actuated.

The mechanism would also include, in the case of the motor 40 and the pin-lock assemblies, suitable integral safety switches.

From the above description and the attached drawings it will be clearly appreciated that the invention has produced a traveling platen designed for machining centers which can be utilized on almost any machine having a table which is desired to extend along one axis of travel primarily the x-axis. Clearly, the platen may be used also in milling machines, surface grinders, EDM machines, drill presses, radical arm drill presses and any other similar type machines.

The resulting platen is of a low profile thereby minimizing any reduction in the z-axis clearance between the supporting platen surface and the associated reciprocating tool.

The unit is rugged in design and incorporates a precision equal to the machine to which it is attached.

Manifestly, the invention can effectively extend the capacity of the x-axis of a machine tool supporting table to 150% for a fraction of the cost of a larger machine.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A travelling platen for attachment to a machine tool comprising:

a planar lower base plate having an upper surface;

means for attaching said base plate to the machine tool;

a planar upper tooling plate having an upper surface and a lower surface and extending a greater length than the length of said base plate;

linear bearings interposed between said lower and upper plates to provide relative linear motion therebetween, said linear bearings including cooperating rail and bearing block members, the rail members extending from the lower surface of said upper plate, and the bearing block members extending from the other of said base plate; and stop means to selectively prevent relative reciprocal linear movement between said lower plate and said upper plate.

2. A travelling platen as defined in claim 1 including side walls depending from marginal edges of said upper tooling plate.

3. A travelling platen as defined in claim 2 wherein said side walls extend parallel to one another and parallel to the x-axis of said upper tooling plate.

4. A travelling platen as defined in claim 1 including pressure fluid actuated motor means coupled between said lower base plate and said upper tooling plate.

5. A travelling platen as defined in claim 1 including stiffening means affixed to said upper tooling plate.

6. A travelling platen as defined in claim 5 wherein said stiffening means is affixed to the lower surface of said upper tooling plate in facing relation to said lower base plate.

7. A travelling platen as defined in claim 1 wherein said stop means includes a pin and cooperating pin receiving means.

8. A travelling platen as defined in claim 7 wherein said pin is integral with said lower base plate and said pin receiving means is integral with said upper tooling plate.

* * * * *